United States Patent
Tan et al.

(10) Patent No.: US 9,529,698 B2
(45) Date of Patent: Dec. 27, 2016

(54) METHOD AND SYSTEM FOR MULTI-MODE TESTING THROUGH OPERATION INTERFACE AND SCENARIO ABSTRACTION IN A MULTI-TENANT DATABASE ENVIRONMENT

(75) Inventors: Keng-Woei Tan, San Francisco, CA (US); James Hang, San Francisco, CA (US); Divya Ashok, Union City, CA (US); Charandeep S. Tatlah, Union City, CA (US); Gene Rivera, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 383 days.

(21) Appl. No.: 13/039,944

(22) Filed: Mar. 3, 2011

(65) Prior Publication Data

US 2012/0016621 A1 Jan. 19, 2012

Related U.S. Application Data

(60) Provisional application No. 61/363,988, filed on Jul. 13, 2010.

(51) Int. Cl.
*G06F 11/36* (2006.01)
(52) U.S. Cl.
CPC .................................. *G06F 11/3672* (2013.01)
(58) Field of Classification Search
CPC .................................................. G06F 11/3672
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |

(Continued)

OTHER PUBLICATIONS

Hunt et al., Classes, Objects, and Variables, Programming Ruby—The Pragmatic Programmer's Guide, 2001.*

*Primary Examiner* — Gregory J Toatley
*Assistant Examiner* — Kyle R Quigley
(74) *Attorney, Agent, or Firm* — Dergosits & Noah LLP; Todd A. Noah

(57) ABSTRACT

Embodiments are described for a system and method for testing a hosted application through a test framework that uses the same operational test code for any one of a plurality of application interfaces. A method under embodiments defines a set of test operations comprising a test for the hosted application, each test operation interacting with the application through an interface of a plurality of interfaces; defines a set of test scenarios, with each test scenario including a number of generic test steps and test operations, and wherein each test scenario includes a function call to the test operation corresponding to the interface to be tested; and executes one or more of the test scenarios to implement a test on the interface to be tested for the hosted application.

18 Claims, 6 Drawing Sheets

(56) References Cited

U.S. PATENT DOCUMENTS

| | | | |
|---|---|---|---|
| 6,002,869 A * | 12/1999 | Hinckley | 717/124 |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier | |
| 6,654,032 B1 | 11/2003 | Zhu | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,016,800 B1 * | 3/2006 | Nguyen | 702/108 |
| 7,062,502 B1 | 6/2006 | Kesler | |
| 7,340,411 B2 | 3/2008 | Cook | |
| 7,401,094 B1 | 7/2008 | Kesler | |
| 7,620,655 B2 | 11/2009 | Larsson | |
| 7,698,160 B2 | 4/2010 | Beaven et al. | |
| 8,010,663 B2 | 8/2011 | Firminger et al. | |
| 8,082,301 B2 | 12/2011 | Ahlgren et al. | |
| 8,095,413 B1 | 1/2012 | Beaven et al. | |
| 8,095,594 B2 | 1/2012 | Beaven et al. | |
| 8,275,836 B2 | 9/2012 | Beaven et al. | |
| 2001/0044791 A1 | 11/2001 | Richter et al. | |
| 2002/0057018 A1 * | 5/2002 | Branscomb | G06F 1/14 307/42 |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 * | 8/2003 | George et al. | 345/864 |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0212826 A1 * | 11/2003 | Rapakko | G06F 17/30575 709/246 |
| 2004/0001092 A1 | 1/2004 | Rothwein et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes Leon et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2006/0195821 A1 * | 8/2006 | Vanspauwen | G06F 11/3664 717/124 |
| 2008/0114841 A1 * | 5/2008 | Lambert | G06Q 10/00 709/206 |
| 2008/0208734 A1 * | 8/2008 | Kaminsky | G06Q 40/025 705/37 |
| 2009/0063415 A1 | 3/2009 | Chatfield et al. | |
| 2010/0153780 A1 * | 6/2010 | Kirtkow et al. | 714/37 |

* cited by examiner

METHOD AND SYSTEM FOR MULTI-MODE TESTING THROUGH OPERATION INTERFACE AND SCENARIO ABSTRACTION IN A MULTI-TENANT DATABASE ENVIRONMENT

CLAIM OF PRIORITY

This application claims the benefit of U.S. Provisional Patent Application 61/363,988 entitled METHODS AND SYSTEMS FOR TESTING AN INTERFACE IN A MULTI-TENANT DATABASE ENVIRONMENT, by Keng-Woei Tan et al., filed Jul. 13, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to multi-tenant database systems, and more specifically to multi-mode testing of database components.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In multi-tenant database systems, such as the salesforce.com service, a multi-tenant architecture is used wherein users or customer organizations (i.e., tenants) share database resources that are organized as one logical database. The database tables themselves are typically shared and logical structures are employed to ensure differentiation and security among the different tenants. For example, each entity in the data model typically contains an organization_id column that distinguishes rows for each tenants. All queries and data manipulations for a tenant use a filter on this indexed column to ensure proper security and the appearance of virtual private databases. The data structure can be used to expose standard entities, such as Account, Contact, Lead, and Opportunity entities to customers.

In a multi-tenant database system, there are typically various applications and processes that are exposed to users through multiple modes of operation. For example, interfacing to the system applications could accomplished through user interfaces (UI), application program interfaces (API), or other development platforms that allow developers to access back-end processes and client-server interfaces. Each of these interfaces represents a different mode of operation. Oftentimes, these applications and processes are required to be tested for all the different supported modes of operation to ensure proper operation across all possible operational modes. In a traditional testing approach, a system administrator or other personnel needs to create test automation for those each of these different modes of operation independently. This results in the replication of the same test scenarios across multiple test suites for different operations, which results in an increase in the effort of test automation and in the deployment and use of redundant test code.

Accordingly, it is desirable to provide techniques enabling efficient testing of multi-tenant database components for different operational modes.

BRIEF SUMMARY

In an embodiment and by way of example, there are provided mechanisms and methods for providing a multi-mode testing scheme for components of a multi-tenant database system. For applications that have multiple modes of interaction with a user or system, such as through a user interface (UI), remote API interface, or local API interface, embodiments include a test framework that abstracts and separates the operational functions from the test scenarios. In this manner, the same test code for the operational functions can be used regardless of the interface to the application. A method under embodiments defines a set of test operations comprising a test for the hosted application, with each test operation interacting with the application through an interface of a plurality of interfaces, and it defines a set of test scenarios, with each test scenario including a number of generic test steps and test operations, and wherein each test scenario includes a function call to the test operation corresponding to the interface to be tested. The one or more test scenarios can then be executed to implement a test on the interface to be tested for the hosted application.

While one or more implementations and techniques are described with reference to an embodiment in which a method for providing an efficient test scheme for multiple for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Systems and methods are described for a testing framework that provides an efficient method for testing a multi-tenant database system through multiple modes of interface accessibility. Aspects of the one or more embodiments described herein may be implemented on one or more computers executing software instructions. The computers may be networked in a client-server arrangement or similar distributed computer network, and one or more of the networked computers may execute application programs that require periodic testing to ensure continuing functionality.

Figure 1:
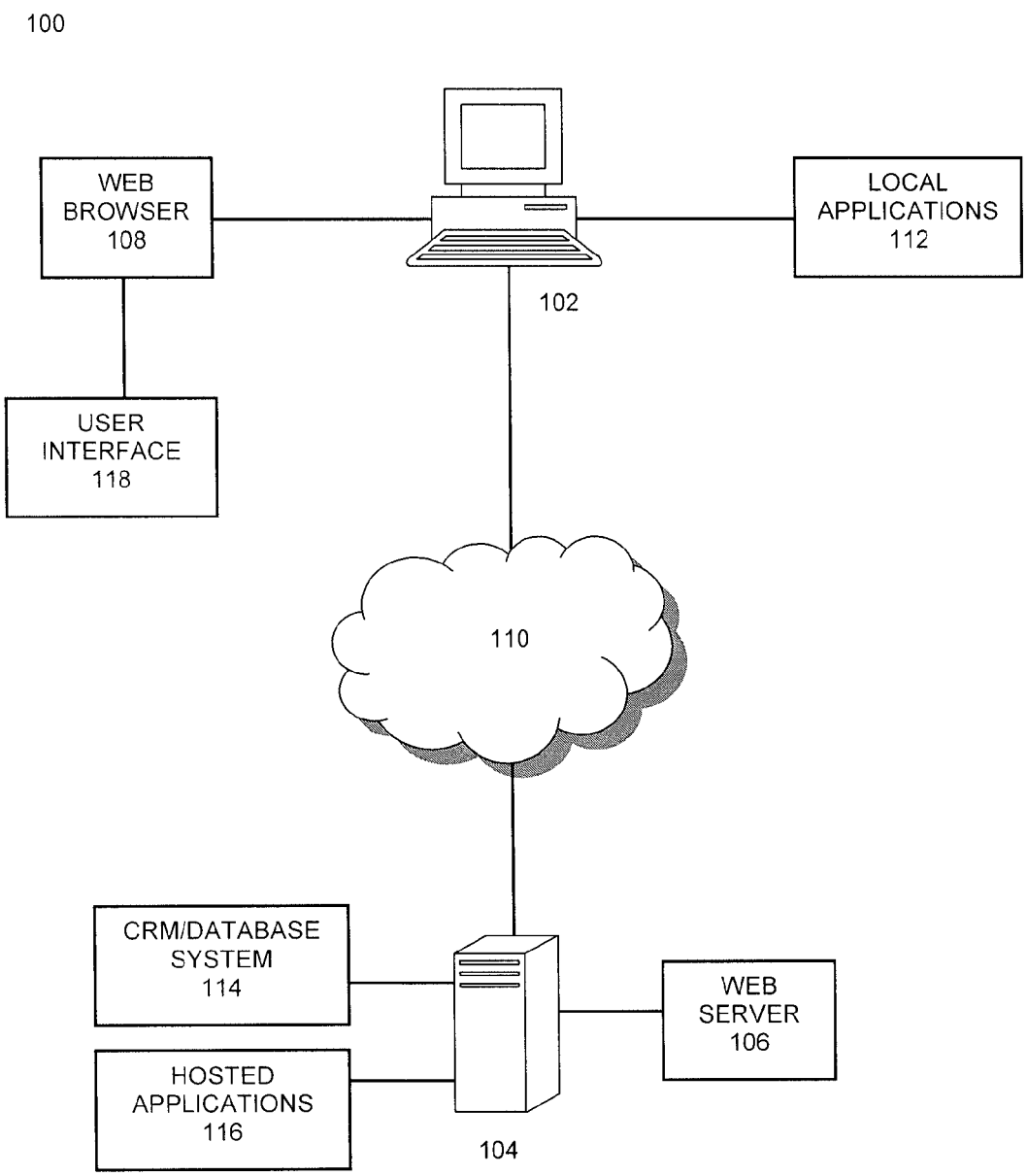
FIG. 1 illustrates a computer network system 100 that implements one or more embodiments of a testing framework for multi-mode applications.

FIG. 1 illustrates a computer network system 100 that implements one or more embodiments. In system 100, a network server computer 104 is coupled to one or more network client computers 102 through a network 110. The network interface between server computer 104 and client computer 102 may include one or more routers (not shown) that serve to buffer and route the data transmitted between the server and client computers. Network 110 may be the Internet, a Wide Area Network (WAN), a Local Area Network (LAN), or any combination thereof.

The client computer 102 of system 100 may be a workstation computer or it may be a computing device such as a workstation, personal computer, notebook computer, personal digital assistant, or the like. The server computer 104 may likewise be implemented within any suitable networkable computing device, such as server-class computers, workstations, personal computers, or any similar device capable of hosting applications accessed over network 110.

In a typical implementation, server computer 104 may be a World-Wide Web (WWW) server that stores data in the form of web pages and transmits these pages as Hypertext Markup Language (HTML) files over the Internet 110 to client computer 102. In a web-based network in which network 110 is the Internet, network server 104 executes a web server process 106 to provide HTML documents, typically in the form of web pages, to client computers coupled to the network. To access the HTML files provided by server 106, client computer 104 executes a web browser process 108 to access web pages available on server 104 and other Internet server sites, such as other content providers.

One or more of the computers in system 100 may execute application programs to perform certain functions. The applications may be installed and executed locally on client computer 102 through local application programs 112. Applications executed on or for client computer 102 may also be hosted on the server computer 104 through hosted application programs 116. The applications 112 and/or 116 may need to be tested at least periodically to ensure functionality. Specialized test routines are usually developed to run the applications through a full suite of tests, depending on system requirements and constraints. Such test programs can be part of an overall test framework that is provided by server 104. In an embodiment, the server computer 104 executes one or more test programs that may be part of an overall routine to test the functionality of applications 112 and/or 116.

In one embodiment, the server 104 is an enterprise server computer that provides comprehensive application and data management functions to a large number of client computers, such as client 102. In this case, the server 104 (which may be implemented as a plurality of separate server computers) functions as a platform for certain customer relationship management (CRM) and database management functions. CRM is generally understood to be a strategy for managing a company's interactions with customers, clients and sales prospects. The CRM platform includes components that organize, automate, and synchronize business processes, such as sales, marketing, customer service, technical support, and other similar activities. CRM functions help companies find and manage clients. For the embodiment of FIG. 1, server 104 may be embodied as an enterprise cloud computing server that distributes business software on a subscription basis and hosts applications 116 offsite of the client 102 site. These applications can be part of a CRM platform that is provided through a Software as a Service (SaaS) model in which software is deployed over the Internet 110 and/or is deployed to run behind a firewall on the client 102.

Figure 2:
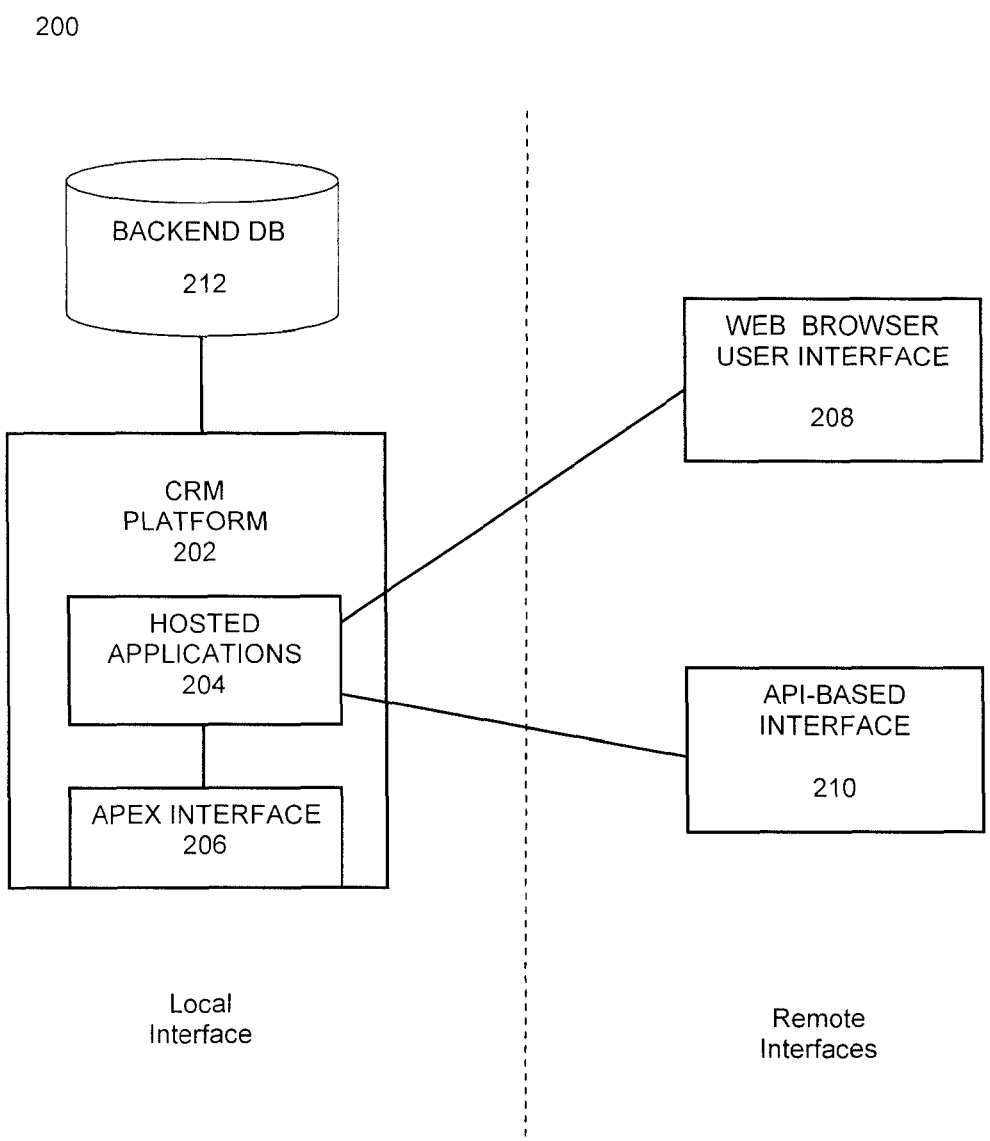
FIG. 2 illustrates various modes of access to hosted applications in a CRM platform, under an embodiment.

In a large scale SaaS enterprise system, such as the Salesforce.com system, there are various applications and processes that are exposed to users through multiple modes of access or operation. These modes of operation include access through web-based user interface, application program interfaces (API), and local host access, among others. FIG. 2 illustrates various modes of access to hosted applications in a CRM platform, under an embodiment. As shown in system 200, a CRM platform server computer hosts a plurality of applications 204. These applications are typically developed by different developers or service providers and hosed on the CRM platform for access by remote users over the Internet. Each hosted application 204 in turn may include a number of different processes or sub-applications. The applications are exposed to users through various different interfaces. These can include a web browser user interface 208 or an API-based interface 210, which both represent remote interfaces to platform 202 by users or processes that are separate from the platform servers.

The interface to the hosted applications 202 can also be provided locally through interface 206, which is resident on the platform server 202. In an embodiment, the local interface is an Apex™ interface. Apex is a development platform for building software as a service (SaaS) applications on top of the customer relationship management (CRM) functionality provided by Salesforce.com. A local interface, such as Apex allows developers to access the back-end database 212 and client-server interfaces to create third-party SaaS applications. The Apex interface 206 includes an API that developers can use to access user data stored in the one or more databases 212 on the CRM platform 202. Such an API generally allows developers to use common SaaS components, like web widgets or a multi-tenant database, without the need to develop much of the infrastructure traditionally associated behind SaaS programs. As shown in FIG. 2, Apex applications are usually hosted and run directly from the CRM platform server 202. As a hosted application, no installation of the application is necessary on the user's client computer. The Apex API is a method of retrieving raw data from the CRM server 202 for use by the client. The API is local to the CRM server, but is used by programs that are external to the CRM server, such as Java applications that need access to information on a client CRM account.

The applications and processes 204 within the CRM platform 202 are generally required to be tested for all the different supported modes of operation. In the traditional testing approach, one would create tests for each of the different modes of operation independently, and replicate the same test scenarios across multiple test suites for different operations. This obviously increases the effort of test automation and results in redundant test code. To eliminate this problem, a test framework under embodiments comprises a test automation approach that performs tests for all of the different operation modes using a common program base. The multi-mode test framework comprises two main components of (1) operation interface and (2) scenario abstraction.

Each application 204 typically comprises both a front-end component and a back-end component. The front-end component includes processes that interact with the user through a user interface, such as the web browser 208. The front-end component provides an interface through which a user can access and log into an application and then perform tasks, such as creating or modifying database records. The back-end component includes processes that interact with the application through API-based processes 210 and/or 206. Through the API interface, users can write custom program code and call an API to create or modify records. The API can be either remote to the system or it may be local to the system. A remote API is usually executed on the client computer 102 for interfacing to the hosted applications 116 on the server 104, whereas the local API is executed directly on the server 104. One example of a local API interface is the Apex code provided by Salesforce.com for use with their CRM platform. Using Apex, a user writes code in the Apex language and uses the API that is hosted locally on the server computer 104.

In general, the front-end and back-end processes may perform many of the same tasks, with the difference being in the interface to the user through the different paths of UI, API, or Apex code. The test framework separates and isolates the actions from the operations. The operations are standard steps initiated by the user and are performed through the UI, remote API, or server-side API (e.g., Apex) interface. With respect to a database system, example operations include starting a sync, stopping a sync, adding a record, editing a record, and so on. Each of these operations can be performed through any one of the interfaces, and the core functionality of each operation remains the same regardless of the interface that is used. The actions comprise the actual processing steps within the operation and that are generic to the operation regardless of the interface. The test framework defines the different standard operations that can be performed by the user. The test framework also defines the different test scenarios for the test or tests that can be performed on the operations. In a database system, an example test scenario could include the steps of: setting up the records, perform the operations, and verify the results. These test scenario steps are abstracted out of the test environment, so that when a test is implemented it only needs to be executed once for any or all of the possible interfaces (UI, API, Apex). The operation actions are provided in a separate class then the test. In this way, the core test functions are separated and decoupled from the operation actions and do not need to be replicated or rewritten for the separate interfaces. The test framework thus comprises the generic operations defined as a separate class and the test steps which are passed in to the different interface operations. In this manner, the test steps are run in the context of each specific interface.

Figure 3:
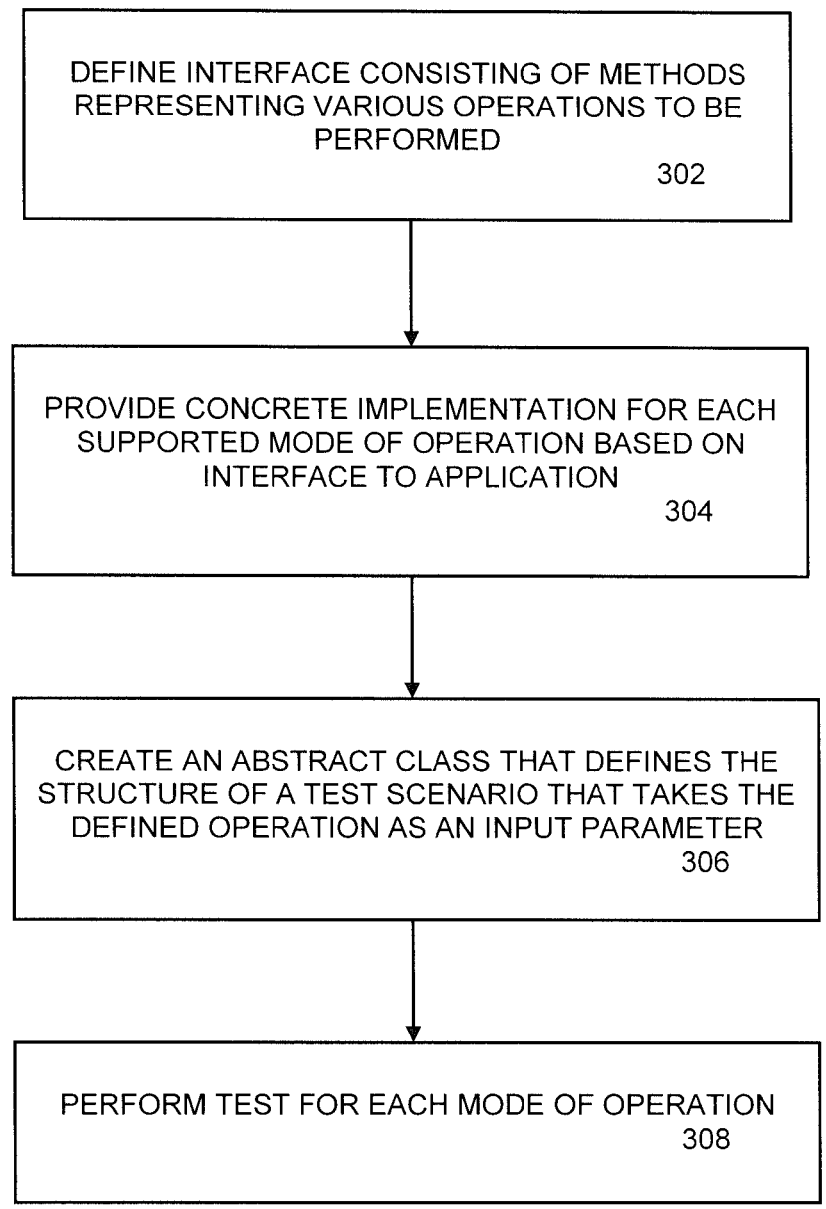
FIG. 3 is a flowchart illustrating a process of implementing a multi-mode testing framework, under an embodiment.

FIG. 3 is a flowchart illustrating a process of implementing a multi-mode testing framework, under an embodiment. As shown in the method 300 of FIG. 3, an interface is defined that consists of methods that represent various operations that can be performed, block 302. For example, an interface call involves certain defined methods, such as start, stop, pause, and resume. A concrete implementation of each supported mode of operation with respect to the different interfaces, is then provided, block 304. For an example operation called "SimpleOperation" the methods are denoted start( ), stop( ), pause( ) and resume( ). For the three different interfaces or operational modes of UI, API, and Apex, the concrete implementation for each supported mode of operation, are then defined as: SimpleOperationUi, SimpleOperationApi, and SimpleOperationApex.

Next, an abstract class is created that defines the structure of a test scenario that takes SimpleOperation as an input parameter, block 306. For example, in the BaseTestScenario class, there is a method called run( ) that invokes setup( ), runScenario( ) and cleanup( ) methods to execute a test scenario. There can be many different implementations of BaseTestScenario class that are developed for testing various distinct scenarios, e.g. TestScenario1, TestScenario2, . . . TestScenarioN, and so on. These test scenario implementations are reusable in conjunction with different concrete operation class to achieve multi-mode testing in which the same test is performed for each of the three interface modes of operation, block 308.

A traditional test performed for each of the interfaces of UI, API, and Apex may be implemented as three separate sets of test code as follows:

| UI Interface | API Interface | Apex Interface |
| --- | --- | --- |
| Test 1 ( ) | Test 1 ( ) | Test 1 ( ) |
| setup ( ) | setup ( ) | setup( ) |
| UI operation | API operation | Apex operation |
| verify( ) | verify( ) | verify( ) |

As can be seen in the above case, three different tests need to be executed, one for each of the interfaces, with the operation steps distinguished on the basis of the interface. In an embodiment, the multi-mode testing framework separates the test scenario from the operations steps so that the operational steps can be reused. In this case, the test scenario is made generic with respect to the interface, and the operation is then defined with respect to the functions of the operation and the different interfaces. This can be illustrated as follows:

| Test Scenario (operation) | Operation ( ) |
| --- | --- |
| setup ( ) | startsync ( ) |
| operation | stopsync ( ) |
| verify ( ) | cancel ( ) |
|  | -   UI operation |
|  | -   API operation |
|  | -   Apex operation |

As can be seen, the abstraction allows the operation to be passed as an argument to the test scenario. The setup and verify, and other common functions are common to the different test scenarios and can be statically defined. The operation portion is passed through the appropriate interface, e.g., UI, API, or Apex. If the UI operation is called, the operation will be called through the UI, if the API operation is called, the operation will be called through the API, and if the Apex operation is called, the operation will be called through Apex. In this manner, the operation is only defined once and used multiple times depending on the interface that is used.

Figure 4:
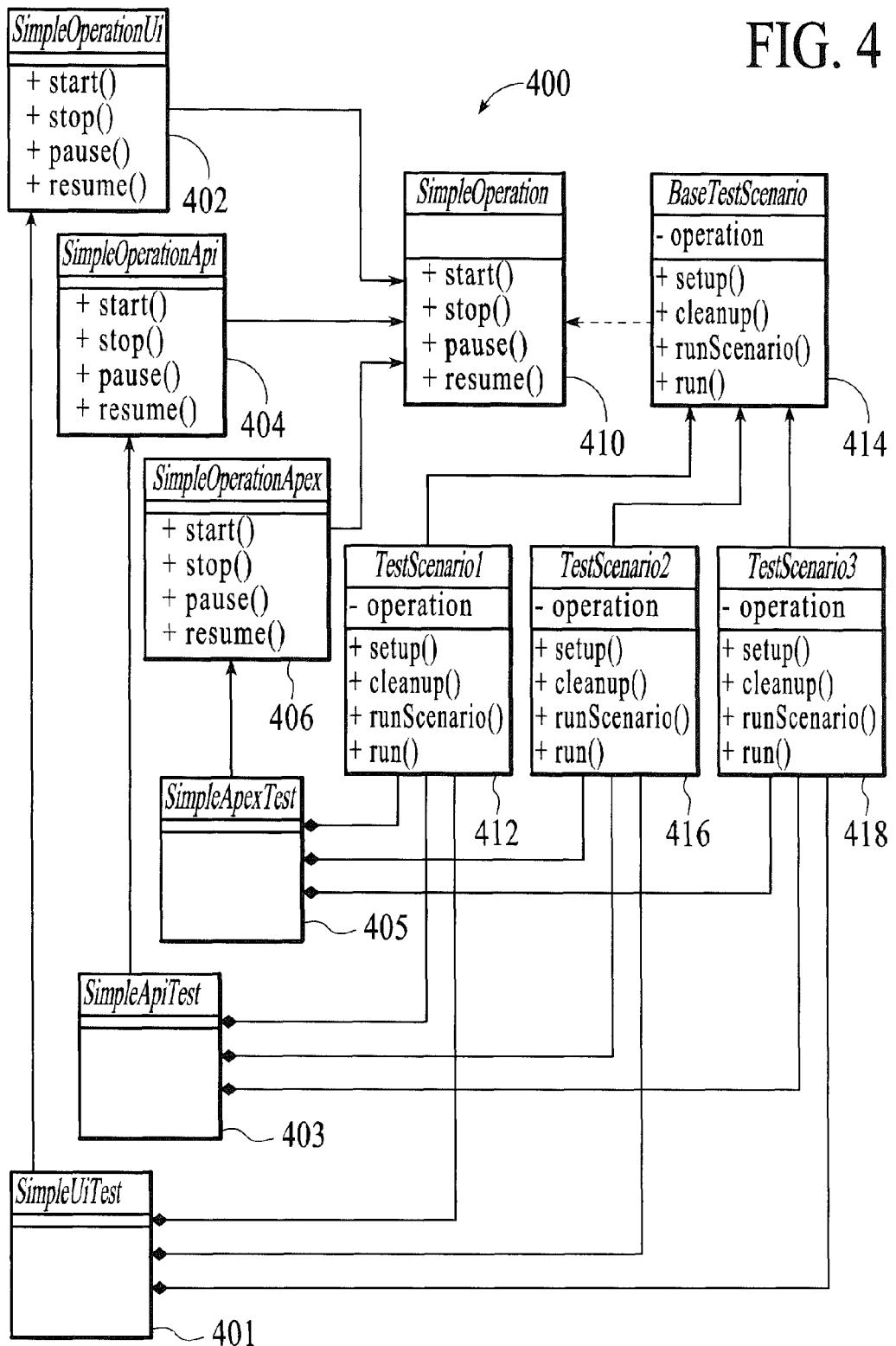
FIG. 4 illustrates an operation interface and scenario abstraction scheme for an example test suite for a multi-mode test platform, under an embodiment.

FIG. 4 illustrates an operation interface and scenario abstraction scheme for an example test suite for a multi-mode test platform, under an embodiment. As shown in FIG. 4, a base test scenario 414 comprises a set of operations for the test to be performed along with generic test steps, such as setup, cleanup, run the test scenario and run the operation. The example of FIG. 4 illustrates three different test scenarios denoted TestScenario 1 412, TestScenario 2 416, and TestScenario 3 418. Each of these test scenarios calls a test module that invokes an operation corresponding to a respective interface. Thus, the SimpleApexTest 405 invokes the Apex operation 406, the SimpleApiTest 403 invokes the API operation 404, and the SimpleUiTest 401 invokes the UI operation 402. These different interface operations are then passed to a SimpleOperation process 410 to be called by the BaseTestScenario 414. As each test scenario is executed the appropriate operation based on the interface is called through the SimpleOperation process 410.

In an embodiment, the testing framework creates an extensible scenario based automation that is created to test sync operations between opportunities and quotes. One common application in a CRM application is to synchronize (sync) quotes with opportunities, with or without line items. The sync operation is usually called near the end of the sales process and is done to ensure that the quote received by a client is a mirror image of the desired opportunity and products with the quote and quote line items. Any mismatch between the database records or fields that are defined as necessary to be in sync will cause a test error, as the quote does not necessarily apply to requested item in this case. The sync process is critical to the operation of the database and is often tested on a frequent periodic basis (e.g., daily or hourly) within an organization. The test platform automation tests the same processes from the UI and the local or remote API interfaces. The automation approach was to create scenarios that emulated the entire process of creating an opportunity through syncing the final quote. This solved the problem of testing the same business process with two different sets of code and avoided all the overhead of setup for the scenario as well. The implementation involved utilizing: abstract classes to provide the basic containers for what needs to be implemented; classes that implement just the operations; classes that described the scenarios; and classes that brought the implementations (UI or API) together with the requisite scenarios. This framework allows the combination and integration of what would have been separate test cases and even test complex business scenarios.

Figure 5:
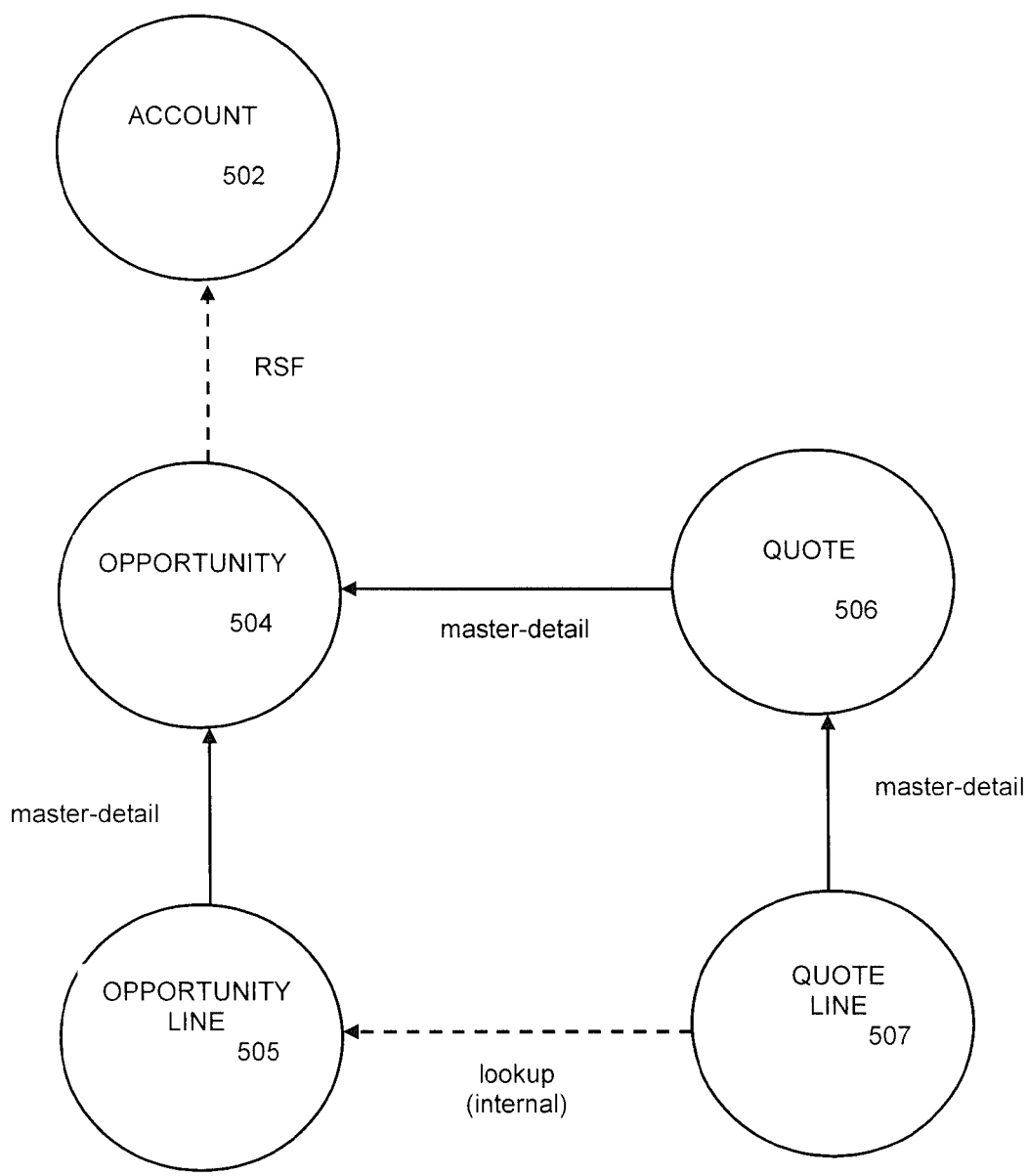
FIG. 5 illustrates the flow associated with quote-opportunity sync testing, under an embodiment.

In an embodiment, the test plan for the sync operation implemented within the test framework covers the following areas: (1) quote & quote line entity save; (2) quote-opportunity sync; and (3) quote sync scrutiny. The test focuses on quote specific functionalities, e.g., calculated summary fields, sync fields and so on. Basic testing functions provided within the base (CRM) platform can be leveraged for testing generic functionalities, such as basic CRUD, DML (data manipulation language) operations and entity save. For quotes-specific entity save and sync testing, operations are grouped into the following categories: basic save and sync, bulk save and sync, partial save and sync, and recursive save and sync. With reference to FIG. 5, example test scenarios for the sync function will be described. FIG. 5 illustrates the flow associated with quote-opportunity (Opp) sync testing, under an embodiment.

One test scenario is the quote entity save operation. The standard base platform functionality that needs to be tested is (1) basic API—insert, update, delete, undelete of Quote & Quote Line 507 entity functionality; (2) entity save—validation, workflow, trigger, RSF (RSF from QuoteLine to Quote 506, RSF from Quote to Opp 504, (RSF from Opp to Acc, RSF from Quote to Account 502, and bulk DML with partial save; (3) standard summary fields for API/Apex/workflow operations that affect Quote/QuoteLine summary fields (Quote: Subtotal, Quote: % Discount, Quote: Discounted Total, Quote: Grand Total, QuoteLine: Sales Price, QuoteLine: Quantity, QuoteLine: Total Price, QuoteLine: Subtotal, QuoteLine: Grand Total). The test checks to see whether these fields have correct value during entity save operations, e.g., workflow/validation rule priorvalue, trigger.new, trigger.old, RSF value, and so on. The test also: verify entity field history tracking on Opp or Quote for sync changes (if Quote support history tracking) and for syncedQuoteId (Opp) and IsSyncing (Quote) when start/stop sync; verifies big deal alerts on Opp, verifies stage history on Opp; verifies approval process on Opp and Quote; verifies sync with entity lock on Quote & QuoteLine or Opp and OppLine 505; verifies sync with validation on Quote & QuoteLine or Opp & OppLine; verifies lookup filtered on syncedQuoteID field.

The Quote-Opp sync occurs when at least one of the following occurs: (1) change synced Quote on Opp; change pricebook on Opportunity or synced Quote; add/delete OppLine on the parent Opportunity or QuoteLine on synced Quote; change any related fields on QuoteLineItem. The fields that are affected are: Quantity, UnitPrice (Sales Price); Discount; HasQtySchedule (OppLine only); HasRevSchedule (OppLine only).

There are certain basic scenarios for changes on synced Quote or Opp parent through UI, API and Apex code. These are as follows: (1) Set initial synced Quote on Opp; (2) Set initial synced Quote on Opp w/ OppLine; (3) Set initial synced Quote from Opp w/ schedules; (4) Insert/Update/Delete QuoteLine on synced Quote; (5) Undelete QuoteLine on synced Quote; (6) Change synced Quote; (7) Insert/Update/Delete OppLine Schedules; (8) Insert/Update/Delete OppLine; (9) Delete synced Quote, (10) Undelete synced Quote; (11) Change pricebook on opp; (12) Change pricebook on synced Quote; (13) Change synced Quote to another Quote w/different pricebook; (14) Delete opp (w/ line & schedules) w/ multiple Quotes; (15) Undelete opp (w/ line & schedules) w/ multiple Quotes; and (16) Multi-line edit on QuoteLine/OppLine In an embodiment, bulk DML operations can be tested through API and Apex code. The tests include (1) Bulk insert/update/delete QuoteLines across multiple synced Quotes for different Opps; (2) Bulk insert/update/delete QuoteLines across multiple Quotes for same Opp parent; (3) Bulk insert/update/delete OppLines across multiple Opps; (4) Bulk insert/update/delete OppLine schedules on different OppLine across multiple Opps; (4) Bulk insert/update/delete/undelete Quotes w/ same Opp parent; (5) Bulk insert/update/delete/undelete Quotes w/ different Opp parent. The above test scenarios can determine wither partial save and verify changes are rollback correctly for: error on Quote-Lines, error on Quote, error on OppLines, or error on Opp.

The quote sync scrutiny function can be used to check for the following: (1) Quote/QuoteLine summary fields are correct; (2) Quote-Opp fields are not out of sync; (3) Orphan Quotes/QuoteLine; (4) Invalid OppLine reference from QuoteLine; (5) Invalid reference to Quote/QuoteLine; and (6) Invalid synced Quote.

As will be appreciated by those of ordinary skill in the art, many special test scenarios and even negative test scenarios can be implemented with regard to certain sync operations using the test framework for multi-mode operation in a CRM system.

The multi-mode test framework is used to create test scenarios that emulate the process of syncing Opportunity records with Quote records, and which can be utilized to execute via the UI, API or Apex operations. The following portions of program code illustrate the implementation of this multi-mode test framework, under an embodiment.

```
public abstract class QuoteSyncOperation {
    void cleanup( ) throws Exception { }
    abstract public void startSync(UserInfo user, String... quoteIds)
            throws Exception;
    abstract public void stopSync(UserInfo user, String... quoteIds)
            throws Exception;
    void startSync(UserInfo user, boolean cancel, boolean error, boolean
            stopSyncWarning, String beforeMsg, String afterMsg,
            String... quoteIds) throws Exception {
        throw new UnsupportedOperationException("This method is not
supported");
    }
    void stopSync(UserInfo user, boolean error, String errorMsg,
            String... quoteIds) throws Exception {
        throw new UnsupportedOperationException("This method is not
supported");
    }
}
public class QuoteSyncOperationImpl {
    public static QuoteSyncOperation syncApex(BaseTest test) throws
            Exception
    {
        return new SyncApex(test);
    }
    public static QuoteSyncOperation syncAPI(BaseTest test) throws
            Exception
    {
        return new SyncAPI(test);
    }
    public static QuoteSyncOperation syncUi(BaseTest test) throws
            Exception {
        return new SyncUi(test);
    }
}
public abstract class QuoteSyncScenario {
    protected BaseTest baseTest = null;
    protected QuoteSyncOperation syncOp = null;
    protected UserInfo user;
    public QuoteSyncScenario (BaseTest test, QuoteSyncOperation op,
    UserInfo
user) {
        this.baseTest = test;
        this.syncOp = op;
        this.user = user;
    }
    protected abstract void setupTestData( ) throws Exception;
    protected abstract void cleanupTestData( ) throws Exception;
    abstract void runScenario( ) throws Exception;
    public void run( ) throws Exception {
        try {
            setupTestData( );
            runScenario( );
        } finally {
            cleanupTestData( );
            syncOp.cleanup( );
        }
    }
```

```
}
}
public class QuoteSyncTest extends BaseTest {
    public void testQuoteSyncApi( ) throws Exception {
        QuoteSyncScenario scenario = new
            QuoteSyncScenarioImpl.BasicQuoteSyncScenario(
                this, QuoteSyncOperationImpl.syncAPI(this),
                testUser);
        scenario.run( );
    }
    public void testQuoteSyncApex( ) throws Exception {
        QuoteSyncScenario scenario = new
            QuoteSyncScenarioImpl.BasicQuoteSyncScenario(
                this, QuoteSyncOperationImpl.syncApex(this),
                testUser);
        scenario.run( );
    }
}
public class QuoteSyncUiTest extends SeleniumTest {
    public void testQuoteSyncUi( ) throws Exception {
        QuoteSyncScenario scenario = new
            QuoteSyncScenarioImpl.BasicQuoteSyncScenario(
                this, QuoteSyncOperationImpl.syncUi(this),
                testUser) {
                @Override
                void runScenario( ) throws Exception {
                    // implement scenario based on UI actions
                }
            };
        scenario.run( );
    }
}
```

The above code segments are provided primarily for purposes of illustration and are not intended to limit the embodiments to any specific code structure, content, or programming language.

Although embodiments of the testing framework have been described in the context of a database sync operation, it is to be understood that such embodiments can also be directed to other operations that involve interaction through two or more interfaces. Thus, the test automation pattern is applicable to many different applications and processes. One example is a social network communication application, such as the Chatter™ application provided by Salesforce.com. Chatter is a collaboration application for the enterprise to connect and share information securely with people at work in real-time. The Chatter application defines an operation interface with the functions: share( ), comment( ), like( ), follow( ), unfollow( ), delete( ), and provides UI, API and APEX implementations for these operations. Using the multi-mode test framework, reusable test scenarios can be created to efficiently run in multi-modes of operation. Similarly, within the CRM context, for processes like lead conversion, workflow approval, merge record operations, and so on can be performed through multiple modes of operation. Each of these operations can be abstracted into operation interface and scenario abstraction and then tested using the test framework.

System Overview

Embodiments of the multi-mode test platform for testing applications can be used in any number IP based network environments. One such environment is a distributed database application that is implemented over a local or wide area network. One example of such an application is a multi-tenant database system. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Figure 6:
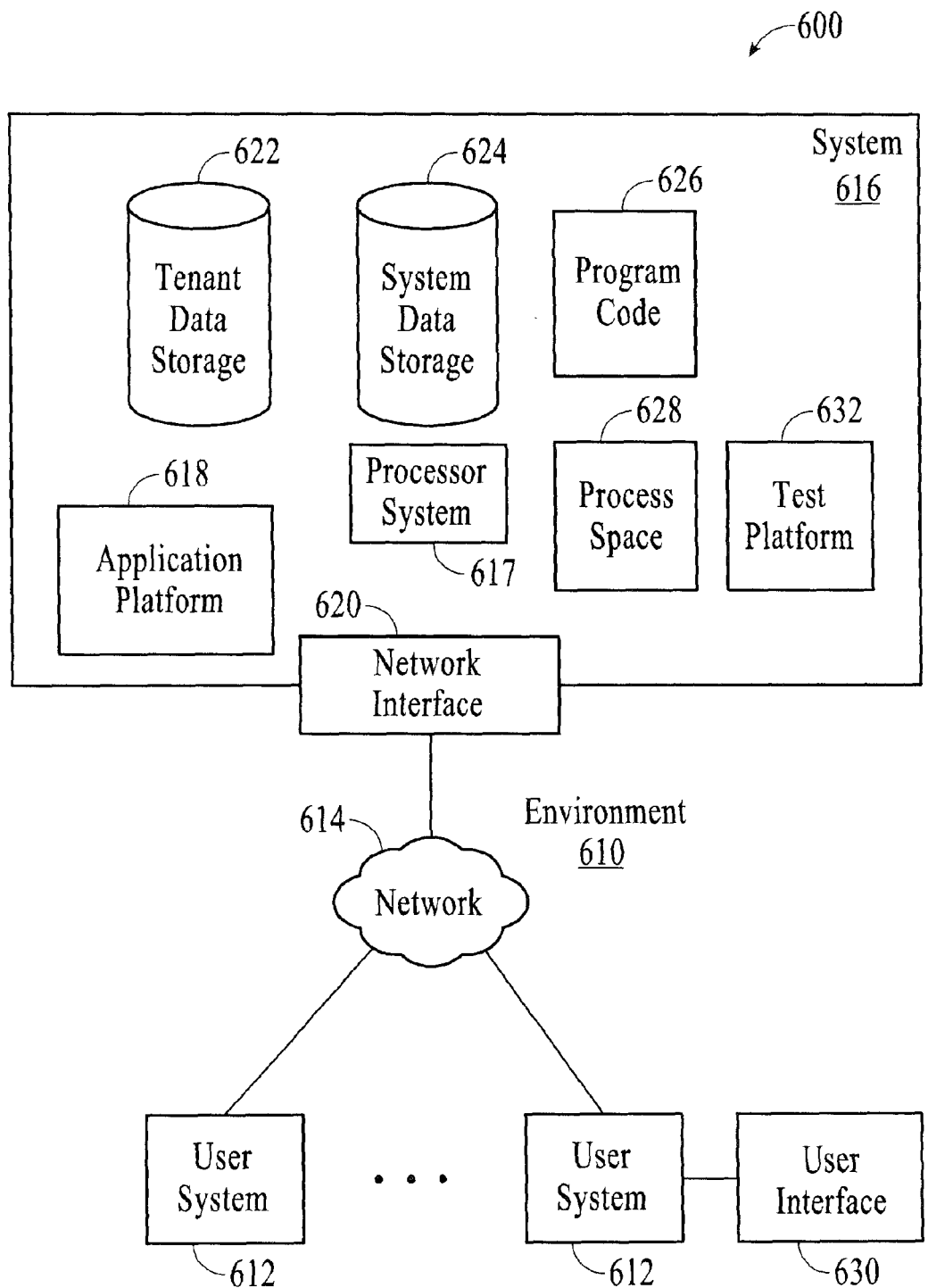
FIG. 6 is a block diagram illustrating an example of an on-demand database service implementing an embodiment of a multi-mode testing framework.

FIG. 6 is a block diagram illustrating an example of an on-demand database service implementing an embodiment of a multi-resource test system for testing multiple web serves and/or web sites in the system. FIG. 6 generally illustrates an overall system 600 that includes an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6, user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the terms "on-demand database service 616" and "system 616" may be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, web pages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, the system may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

The applications 618 within system 616 each represent a set of operations that interact with system components and user systems 612 through one or more operational interfaces. As described above, the applications may comprise front-end and back-end components that interface between the user and the system through a UI component 630 and/or through remote API processes or local API processes (e.g., Apex). A test platform 632 in accordance with embodiments described above tests the functionality of an application using a common set of test code for the operations of the application, and different test scenarios for the interfaces. The test platform is typically provided as part of an automated test process that is provided as part of the overall system functionality provided to the users. The test platform can include tests that are run as part of an automated test suite that is initiated manually by the user, performed periodically on an automated basis (e.g., hourly, daily, weekly, etc.), or run upon triggering by a defined event (e.g., logon by a user).

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel x86 processor or the like. Similarly, system 616 (and additional instances of an MTS, where more than one is present) and all of their components might be operator configurable using application(s) including computer code to run using a central processing unit such as processor system 617, which may include an Intel x86 processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun Microsystems, Inc.).

According to one embodiment, each system 616 is configured to provide web pages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

In certain embodiments, user systems 612 (which may be client systems) communicate with application servers to request and update system-level and tenant-level data from system 616 that may require sending one or more queries to tenant data storage 622 and/or system data storage 624. System 616 may automatically generate one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

For the purpose of the present description, a data object is any type of distinguishable data or information, such as an image, video, sound, text, or other type of data. A data object may include multiple types of distinguishable data, such as an image combined with descriptive text, and it may also comprise a dynamic signal such as a time varying signal. A data object as used herein is to be interpreted broadly to include stored representations of data including for example, digitally stored representations of source information. A data set is a collection of data objects, and may comprise a collection of images, or a plurality of text pages or documents. A user is utilized generically herein to refer to a human operator, a software agent, process, or device that is capable of executing a process or control.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of testing an application in an on-demand database system, the method comprising:
defining a test framework for the application, wherein the application is accessible through a plurality of interfaces, the test framework comprising:
a set of test operations, each test operation corresponding to at least one operational function of the application performed upon a database of the on-demand database system and each test operation corresponding to one of the plurality of interfaces, the plurality of interfaces including at least a local interface, a web-based user interface and an application programming interface, the set of test operations including a test operation to synchronize records within the on-demand database system;
a set of test scenarios including a test scenario to test record synchronization on at least two of the plurality of interfaces, the at least two of the plurality of interfaces including an application programming interface, the test scenarios being defined in a separate class from the test operations, the test scenario to test record synchronization including: i) at least one generic test step corresponding to at least one standard action being performed independent of the interfaces to be tested; and ii) at least one test command configured to invoke the test operations to synchronize records corresponding to the interfaces to be tested, the test operations being received by the test scenario as arguments, the test command causing the operational function of the application corresponding to the received test operation to be executed through the corresponding interface; and
executing one or more of the test scenarios to implement a test on the interfaces to be tested for the application, wherein the executing is performed based on the at least one generic test step and the received test operations.

2. The method of claim 1 wherein the web-based user interface is configured to interact with the application through a web browser executed on a client computer coupled to a server computer hosting the application.

3. The method of claim 2 wherein the application programming interface comprises a remote application programming interface executed on the client computer.

4. The method of claim 2 wherein the local interface comprises a local application programming interface executed on the server computer.

5. The method of claim 1 wherein the application is maintained by a server computer coupled to a web-based client computer over the Internet, and comprises a front-end process accessible through the web-based user interface, and a back-end process accessible through one of a remote application programming interface and a local application programming interface.

6. The method of claim 5 wherein the set of test operations comprises part of a database record synchronization function.

7. The method of claim 6 wherein the application comprises part of a customer relationship management (CRM) system and the server computer is configured to function as a platform for the CRM system for a plurality of distributed client computers, and wherein the database record synchronization function is configured to synchronize customer opportunities with specific quotes.

8. A system for testing an application in an on-demand database system, the system comprising:
one or more processors; and
a non-transitory computer readable medium storing a plurality of instructions, which when executed, cause the one or more processors to:
defining a test framework for the application, wherein the application is accessible through a plurality of interfaces, the test framework comprising:
a set of test operations, each test operation corresponding to at least one operational function of the application performed upon a database of the on-demand database system and each test operation corresponding to one of the plurality of interfaces, the plurality of interfaces including at least a local interface, a web-based user interface and an application programming interface, the set of test operations including a test operation to synchronize records within the on-demand database system;
a set of test scenarios including a test scenario to test record synchronization on at least two of the plurality of interfaces, the at least two of the plurality of interfaces including an application programming interface, the test scenarios being defined in a separate class from the test operations, the test scenario to test record synchronization including: i) at least one generic test step corresponding to at least one standard action being performed independent of the interfaces to be tested; and ii) at least one test command configured to invoke the test operations to synchronize records corresponding to the interfaces to be tested, the test operations being received by the test scenario as arguments, the test command causing the operational function of the application corresponding to the received test operation to be executed through the corresponding interface; and
execute one or more of the test scenarios to implement a test on the interfaces to be tested for the application, wherein the executing is performed based on the at least one generic test step and the received test operations.

9. The system of claim 8 wherein the plurality of instructions, when executed, further cause the one or more processors to interact with the application through a web browser executed on a client computer coupled to a server computer hosting the application.

10. The system of claim 9 wherein the application programming interface comprises a remote application programming interface executed on the client computer.

11. The system of claim 9 wherein the local interface comprises a local application programming interface executed on the server computer.

12. The system of claim 8 wherein the application is maintained by a server computer coupled to a web-based client computer over the Internet and comprises a front-end process accessible through the web-based user interface, and a back-end process accessible through one of a remote application programming interface and a local application programming interface.

13. The system of claim 12 wherein the set of test operations comprises part of a database record synchronization function.

14. The system of claim 13 wherein the application comprises part of a customer relationship management (CRM) system and the server computer is configured to function as a platform for the CRM system for a plurality of distributed client computers, and wherein the database record synchronization function is configured to synchronize customer opportunities with specific quotes.

15. A non-transitory computer program product comprising computer readable program code for testing an application in an on-demand database system, the program code to be executed by one or more processors when retrieved from a non-transitory machine-readable medium, the program code including instructions to:
defining a test framework for the application, wherein the application is accessible through a plurality of interfaces, the test framework comprising:
a set of test operations, each test operation corresponding to at least one operational function of the application performed upon a database of the on-demand database system and each test operation corresponding to one of the plurality of interfaces, the plurality of interfaces including at least a local interface, a web-based user interface and an application programming interface, the set of test operations including a test operation to synchronize records within the on-demand database system;
a set of test scenarios, including a test scenario to test record synchronization on at least two of the plurality of interfaces, the at least two of the plurality of interfaces including an application programming interface, the test scenarios being defined in a separate class from the test operations, the test scenario to test record synchronization including: i) at least one generic test step corresponding to at least one standard action being performed independent of the interface to be tested; and ii) at least one test command configured to invoke the test operations to synchronize records corresponding to the interfaces to be tested, the test operations being received by the test scenario as arguments, the test command causing the operational function of the application corresponding to the received test operation to be executed through the corresponding interface; and
execute one or more of the test scenarios to implement a test on the interfaces to be tested for the application, wherein the executing is performed based on the at least one generic test step and the received test operations.

16. The medium of claim 15 wherein the application is maintained by a server computer coupled to a web-based client computer over the Internet and comprises a front-end process accessible through the web-based user interface, and a back-end process accessible through one of a remote application programming interface and a local application programming interface.

17. The medium of claim 16 wherein the set of test operations comprises part of a database record synchronization function.

18. The medium of claim 17 wherein the application comprises part of a customer relationship management (CRM) system and the server computer functions as a platform for the CRM system for a plurality of distributed client computers, and wherein the database record synchronization function synchronizes customer opportunities with specific quotes.

* * * * *